Dec. 23, 1930.  S. E. BOUCHARD  1,785,929
OPHTHALMIC MOUNTING
Filed Nov. 8, 1928

SAMUEL E. BOUCHARD
INVENTOR
BY G. A. Ellestad
ATTORNEY

Patented Dec. 23, 1930

1,785,929

UNITED STATES PATENT OFFICE

SAMUEL E. BOUCHARD, OF ROCHESTER, NEW YORK, ASSIGNOR TO BAUSCH & LOMB OPTICAL COMPANY, OF ROCHESTER, NEW YORK, A CORPORATION OF NEW YORK

OPHTHALMIC MOUNTING

Application filed November 8, 1928. Serial No. 317,988.

This invention relates to ophthalmic mountings and more particularly it has reference to ophthalmic mountings which comprise metallic and non-metallic parts in combination. The present invention involves mountings wherein a metallic rim embraces a non-metallic rim with a lens seated in the non-metallic rim, similar to the type disclosed in Patent No. 1,177,367 issued to F. A. Stevens on March 28, 1916.

One of the objects of the present invention is to provide an improved ophthalmic mounting having a metallic rim embracing a non-metallic rim and a lens seated in the non-metallic rim; another object is to provide such a mounting with means for holding together the non-metallic and metallic rims; and still another object is to provide a mounting of the type described with a non-metallic rim of such a structure that it will fit into a metallic rim which has a more or less standard construction. To these and further ends, the invention resides in certain novel features of construction, arrangement and combination of parts as will hereinafter be more fully described and pointed out in the appended claims.

Referring to the drawings.

Figure 1:
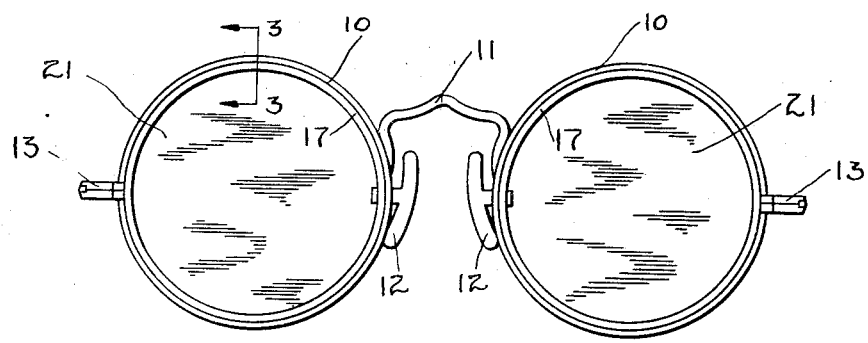
Fig. 1 shows a front elevation of a pair of spectacles embodying my invention.
Figure 2:
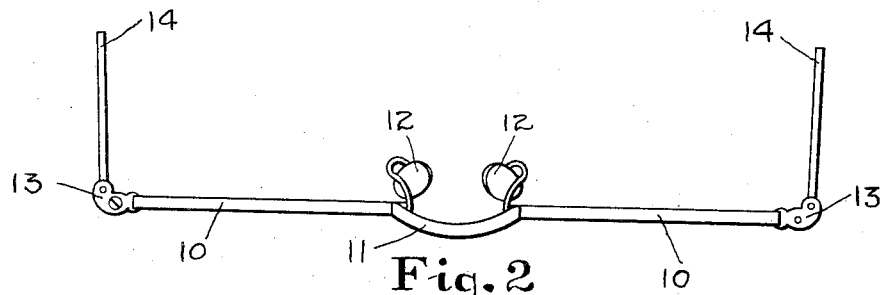
Fig. 2 shows a top plan view of same.

A preferred embodiment of my invention is illustrated in the drawings wherein there is shown a pair of spectacles comprising two metallic rims 10 which are connected by the bridge 11. Suitable nose pads 12 are secured to the metallic rims, as are the usual end pieces 13 carrying temples 14.

Figure 3:
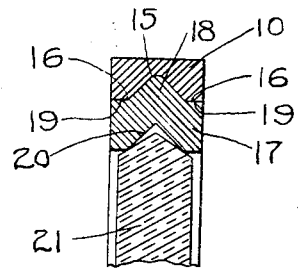
Fig. 3 is a sectional view taken on line 3—3 of Fig. 1.

As clearly shown in Fig. 3, the metallic rim 10 has, on its inner circumference, the centrally disposed groove 15 with the flat, annular shoulder portion 16 on each side of the groove. Mounted within the metallic rim 10 is the non-metallic rim 17 which may be made of celluloid, shell, zylonite or any other suitable non-metallic material. The non-metallic rim 17 has an outer peripheral ridge or projection 18 and a relatively flat, annular shoulder portion 19 at each side of the projection 18. The inner circumference of the rim 17 is provided with a groove 20 which receives the edge of a lens 21.

In assembling my improved mounting, the non-metallic rim, which is preferably a continuous rim without a split, is forced over the lens 21 so that the lens is firmly seated in groove 20 of the rim 17. The non-metallic rim is yieldable so it can be easily stretched over the edge of the lens, the proper diameters of rim and lens having, of course, been selected, all as will be obvious to those skilled in the art. The lens, together with its non-metallic rim, is then inserted in a metallic spectacle frame so that the metallic rim or eye wire of the frame is clamped around the non-metallic rim to thereby firmly hold the lens.

It will be noted in Fig. 3 that the peripheral projection 18 of the rim 17 is seated in the groove 15 of the metallic rim 10 and that the shoulder portions 19 of the rim 17 are in abutting relation with the shoulder portions 16 of the metallic rim 10. Such a structure serves to hold the non-metallic rim within the metallic rim and prevents any twisting or warping of the rim 17. This is an important feature as it makes it possible to sell the metallic frame with the non-metallic rims mounted therein but without the lenses, since my improved structure provides a means for securely holding the non-metallic rim within the metallic rim, even without clamping the rims around a lens.

The construction of my non-metallic rim is such that it will properly fit into the groove of a metallic rim which is more or less standard on the market. Thus the metallic rim 10, shown in Fig. 3, has a structure which is relatively common to many metallic frames which are made and sold.

Besides serving as a shock absorber to reduce breakage of the lens, the non-metallic rim 17 produces an ornamental appearance. Thus, for example, the frame shown in Fig. 1 can be made with a black zylonite rim surrounding the lens and with a white gold metallic rim surrounding the black zylonite rim thereby producing an effect that is pleasing in appearance.

From the foregoing it will be apparent that I am able to attain the objects of my invention and provide an improved ophthalmic mounting of the character described. Various modifications can obviously be made without departing from the spirit of the invention as pointed out in the appended claims.

I claim:

1. An ophthalmic mounting comprising in combination a metallic rim having a groove on its inner circumference, a flat, annular shoulder portion on said inner circumference on each side of said groove, a non-metallic rim having a circumferential projection and a flat, annular shoulder portion on each side of said projection, said projection being seated in said groove and the shoulder portions on said metallic rim being in contact with the shoulder portions on said non-metallic rim.

2. An ophthalmic mounting comprising a metallic rim having a V-shaped groove on its inner circumference, a flat shoulder portion disposed on each side of said groove on said inner circumference, a non-metallic rim having a circumferential projection and a flat shoulder portion on each side of said projection, said metallic rim embracing said non-metallic rim, with said projection seated in said groove and with the shoulder portions of one rim contacting with the shoulder portions of the other rim, the annular sides of the two rims being substantially flush with each other.

SAMUEL E. BOUCHARD.